United States Patent [19]

Krofta

[11] Patent Number: 4,923,600
[45] Date of Patent: May 8, 1990

[54] WATER CLARIFICATION SYSTEM ADAPTED FOR REMOVING PARTICULATE MATTER OF GREATER THAN A PREDETERMINED SIZE

[75] Inventor: Milos Krofta, Lenox, Mass.

[73] Assignee: Lenox Institute for Research, Inc., Lenox, Mass.

[21] Appl. No.: 90,775

[22] Filed: Aug. 28, 1987

[51] Int. Cl.$^5$ .............................. B01D 23/24
[52] U.S. Cl. ................... 210/107; 210/108; 210/203; 210/415; 210/520
[58] Field of Search ............ 210/107, 108, 200, 201, 210/203, 295, 415, 520

[56] References Cited

U.S. PATENT DOCUMENTS

| | | | |
|---|---|---|---|
| 886,068 | 4/1908 | Potter | 210/201 |
| 1,357,499 | 11/1920 | Hunt | 210/525 |
| 2,606,663 | 8/1952 | Blackman et al. | 210/413 |
| 3,822,788 | 7/1974 | Dunkers et al. | 210/200 |
| 3,997,441 | 12/1976 | Pamplin, Jr. | 210/415 |
| 4,022,696 | 5/1977 | Krofta | 210/520 |
| 4,184,967 | 1/1980 | Krofta | 210/525 |
| 4,297,209 | 10/1981 | Devisser et al. | 210/108 |
| 4,377,485 | 3/1983 | Krofta | 210/704 |
| 4,379,058 | 4/1983 | Bolton | 210/415 |
| 4,626,345 | 12/1986 | Krofta | 210/104 |

*Primary Examiner*—Bernard Nozick
*Attorney, Agent, or Firm*—Wolf, Greenfield & Sacks

[57] ABSTRACT

Apparatus adapted for use in a water clarification system which removes particles of greater than a predetermined size from the clarified water includes a screen or a pair of concentric screens positioned in a clarified water storage area between an inlet and a clarified water outlet. One or more spray heads for direct a shower of high pressure filtered clarified water at the outlet side of the screen or screens to loosen or remove particles therefrom. In addition, a rotating brush can act on the inlet side of the screen. Particles removed by the cleaning elements are recirculated through the system. Water levels are maintained by overflow control or by monitoring the water level and utilizing the output from the monitor or monitors to selectively control valves in the inlet or outlets from the system.

8 Claims, 5 Drawing Sheets

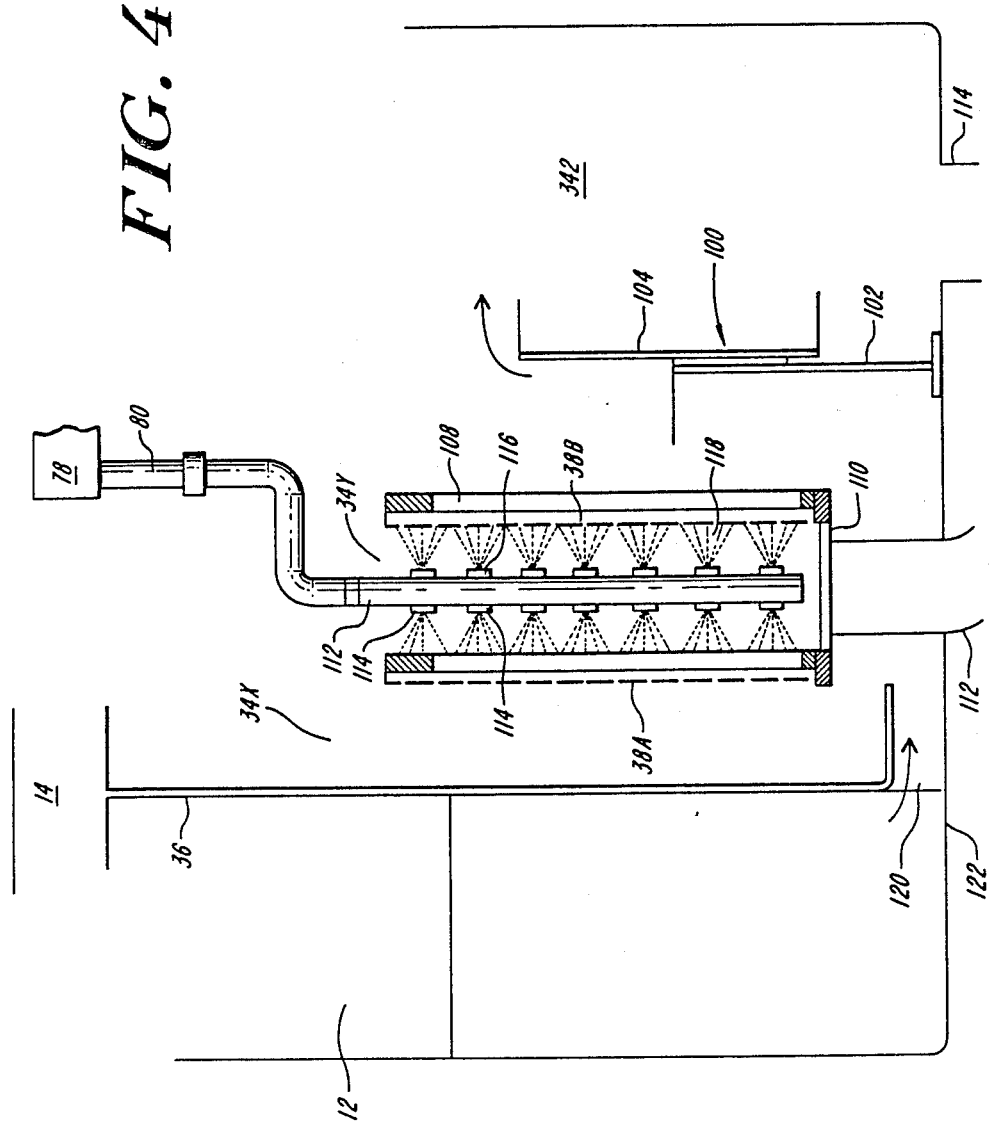

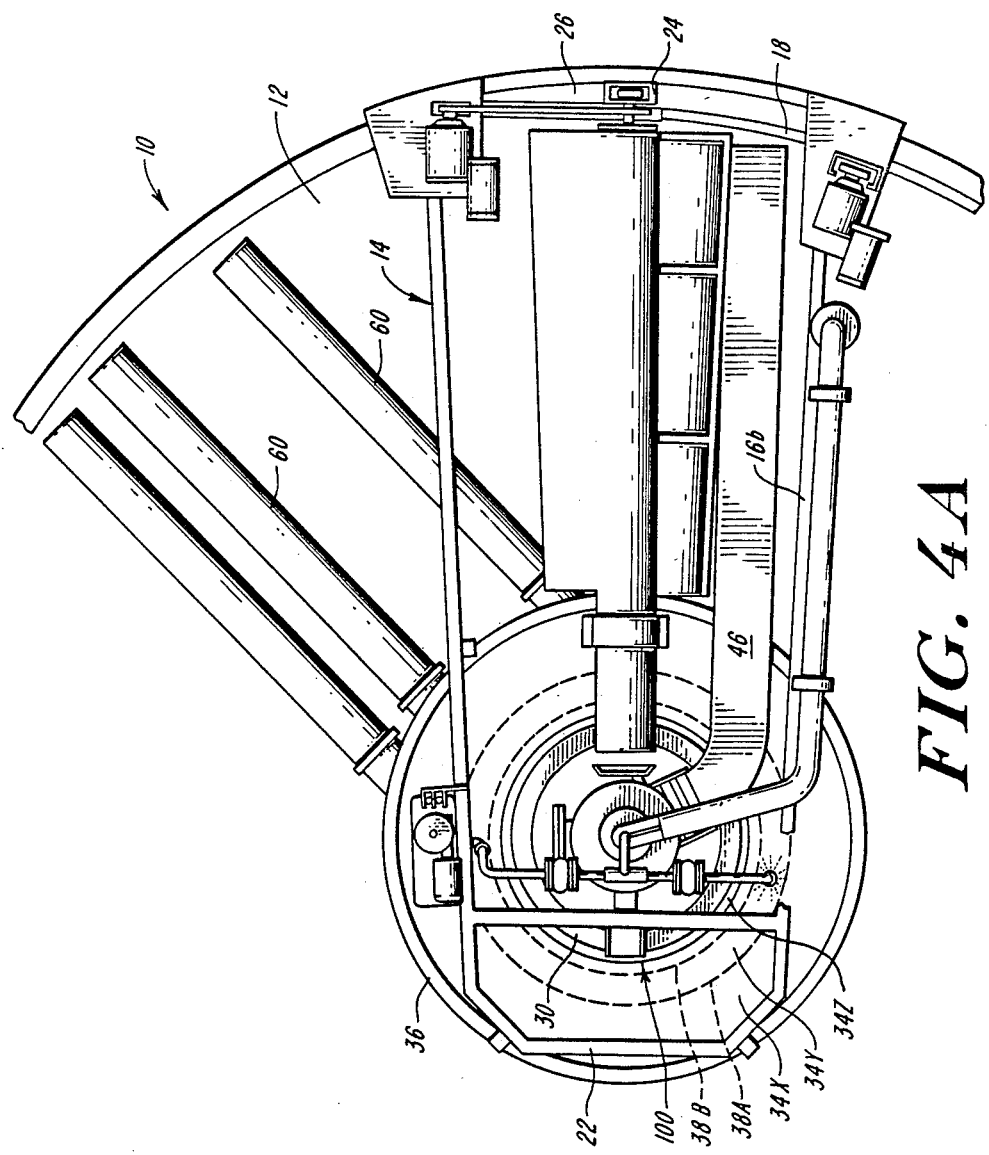

WATER CLARIFICATION SYSTEM ADAPTED FOR REMOVING PARTICULATE MATTER OF GREATER THAN A PREDETERMINED SIZE

This invention relates to water clarification systems and more particularly to apparatus for use in a water clarification system which removes particles of greater than predetermined size from the clarified water.

BACKGROUND OF THE INVENTION

There are many applications where it is desired to remove particulate matter from water either for ecological reasons or to permit the water to be utilized for a desired purpose. Most commonly, such systems are used in industrial applications, such as paper mills, to remove particulate matter introduced into the water during an industrial process before returning the water to the river, lake, or other body from which it was originally obtained.

The second, and increasingly important, application of such systems is to purify water for domestic use. Such systems are normally utilized by towns or other municipalities.

Water clarification systems are generally of two types, sedimentation systems or flotation systems. Flotation systems require much smaller equipment for the same particle removing capacity, and are therefore preferred. An example of a flotation water clarification system is shown in U.S. Pat. No. 4,022,696 issued May 10, 1977, to Dr. Milos Krofta, the applicant herein.

This system has proved capable of reducing the suspended solids or particles in incoming water initially containing up to 1500 parts per million (ppm) to below 20 ppm. While this results in clarified water satisfactory for most industrial applications, it is still possible to have solid particles in the clarified water which are of a size in excess of 100 to 300 microns. Such particles are big enough to clog shower heads, nozzles, or other very small orifices through which water passes in domestic and some industrial applications.

Therefore, in order to permit flotation water clarification systems of, for example, the type disclosed in the above mentioned Krofta patent to be utilized in domestic and other applications where the water may be required to pass through small orifices, it is necessary that an additional filtering step be performed. Ideally, such filtering would be done in the clarification system. However, particles trappped by the screen or other filtering element reduce clarified water flow and, if the filtering element is not continuously or at least regularly cleaned, would in a short time completely block the filtering element. Also, even if the filter is cleaned, there remains the problem of how to control the buildup of filtered particles. Heretofore, space limitations in the system and the complexity of equipment for effectively cleaning the filtering element(s) and flushing the filtered particles have necessitated that a separate installation be provided for the filtering step with separate tanks, pumps, piping, and other components. Having such a separate facility and separate equipment is costly, both in terms of the additional equipment required and the additional space for housing such equipment.

It is therefore an object of this invention to provide a fine particle removal capability that can be incorporated in known water clarification apparatus.

A more specific object of the invention is to provide a flotation water clarification system capable of continuously removing particles of above a predetermined size, such as for example 100 to 300 microns, from the clarified water without requiring a costly additional installation.

Another object is to provide a fine particle removal capability that can filter either 100%, or some lower percentage, of the total clarified water flow.

SUMMARY OF THE INVENTION

In accordance with the above, this invention provides apparatus adapted for use in a water clarification system having an area for storage of clarified water and at least one clarified water outlet, which apparatus removes particles of greater than a predetermined size from the clarified water. The apparatus has a filtering element with openings generally less than the predetermined size positioned between the inlet to the clarified water storage area and a clarified water outlet. The filtering element is preferably a screen. There is also a cleaning means operative on the outlet side of the screen for loosening and removing particles from the screen. This cleaning means is preferably a row of shower nozzles which direct water, preferably filtered clarified water, under pressure along a line from substantially one edge of the screen to the other in one dimension, and means for moving the row of nozzles relative to the screen in the other direction, whereby fluid pressure may be applied across the entire outlet side of the screen. In a first embodiment, there is also a second cleaning means which is operative on the inlet side of the screen for cleaning particles therefrom. This second cleaning means is preferably a brush that rotates about its own axis and also is mounted to rotate around in the clarified water area to reach the entire screen. If the screen is positioned to intercept all, or substantially all, of the clarified water flow, the invention also includes means for controlling the buildup of fine particles at the inlet side of the screen. In the preferred form, this includes an outlet which removes a portion of the unscreened clarified water, typically 20%, and directs it back to the main raw water inlet via an air dissolver tube and a pump.

For a second preferred embodiment, the filtering element is a pair of spaced, concentric circular screens positioned in the area for storage at a point spaced from the side walls and the bottom of the storage area. The cleaning means in this embodiment includes means positioned in the space between the screens for applying water under pressure to the outlet side of both screens.

More specifically, this invention relates to a water clarification system which includes a cylindrical flotation tank, a carriage rotating above the tank, first means rotating with the carriage for inputting water to be clarified into the tank, such water having dissolved air and flocculating chemicals therein which combine to cause particles in the water to float to the surface of the tank, second means rotating at least in part with the carriage for collecting particles on the surface of the tank and for outputting the collected particles, and third means rotating with the carriage for removing clarified water from a point near the bottom of the tank. The system also has a clarified water outlet, a circular screen having openings of less than a predetermined size positioned between the third means and the clarified water outlet to remove particles of greater than said predetermined size from the clarified water and means rotating with the carriage for cleaning the screen. The means for cleaning the screen may include a brush in contact with the inlet side of the screen, means for rotating the brush, and means for mounting the brush for rotation with the carriage about the inlet side of the screen. The means for cleaning may also include a row of shower nozzles positioned to direct clarified water from substantially the top to substantially the bottom of the outlet side of the screen, and means for mounting the row of nozzles for rotation with the carriage over the outlet side of the screen. For one embodiment of the invention, a pair of spaced circular concentric screens are provided near the center of the clarified water storage area with a head having a row of nozzles facing each screen being positioned in the area between the screens and rotating with the carriage to effect cleaning of both screens.

In one embodiment of the invention where 100% of the clarified water is filtered, desired water levels are maintained by monitoring the water level in at least one area and controlling either the rate at which water is applied to selected areas or preferably the rate at which water is removed from such areas to maintain desired water levels. In a second embodiment of the invention, desired water levels are maintained by permitting excess clarified water to spill over into a removal area.

The buildup of removed particles in the clarified water storage area, which could alter flow rate, is controlled in one embodiment of the invention by flushing and draining a sufficient quantity of the unfiltered clarified water, for example 20%, to prevent a buildup of such particles. In another embodiment of the invention, a flow path of clarified water is maintained which carries such particles to an overflow removal outlet.

The foregoing and other objects, features and advantages of the invention will be apparent from the following more particular description of preferred embodiments of the invention as illustrated in the accompanying drawings.

IN THE DRAWINGS

FIG. 4 is an enlarged side view of apparatus of a second preferred embodiment of the invention.

FIG. 4A is a fragmentary top plan view of a water clarification system corresponding to FIG. 1 but showing the second preferred embodiment of FIG. 4.

DETAILED DESCRIPTION

Figure 1:
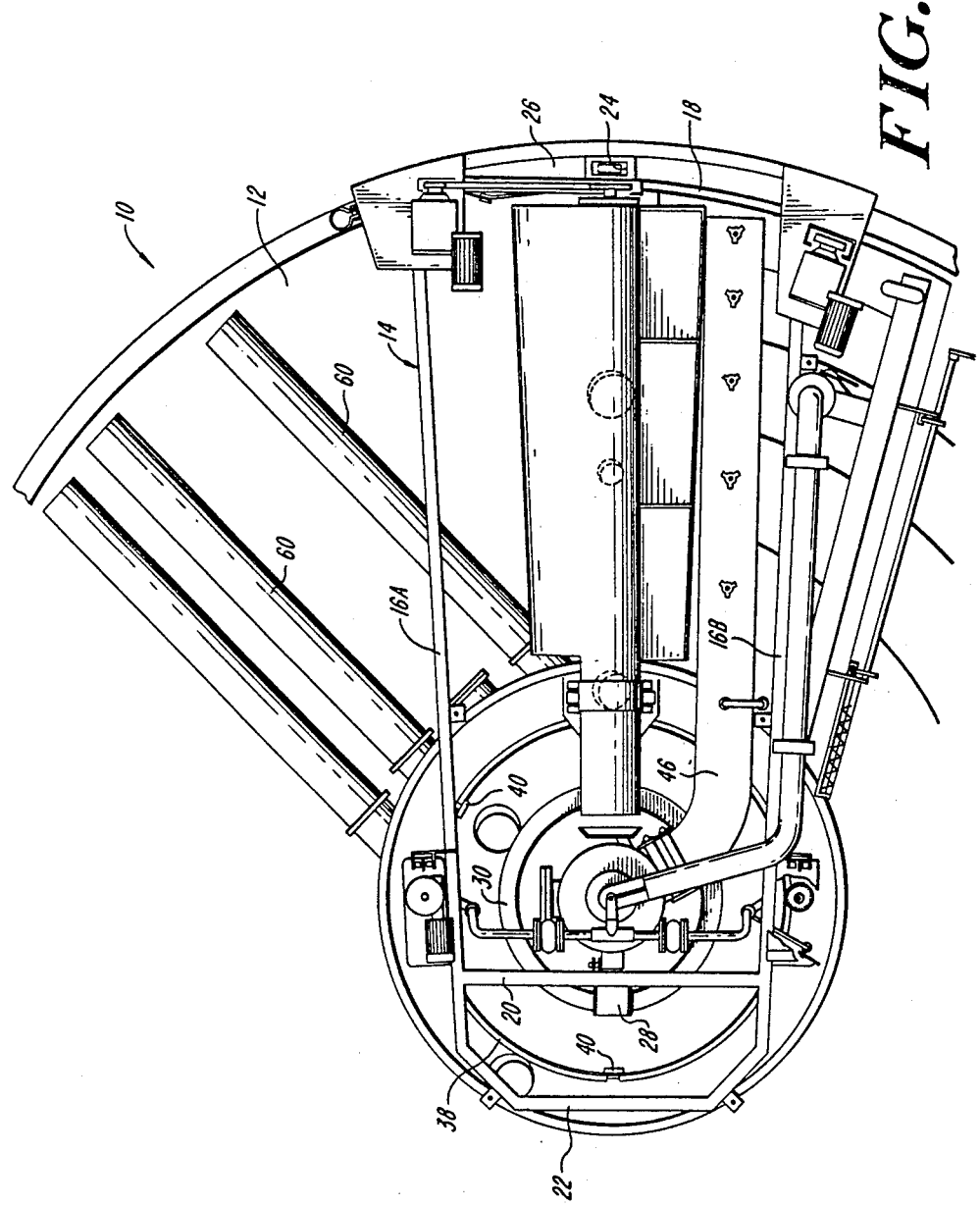
FIG. 1 is a fragmentary top view of a water clarification system utilizing apparatus of a preferred embodiment of the invention.
Figure 2:
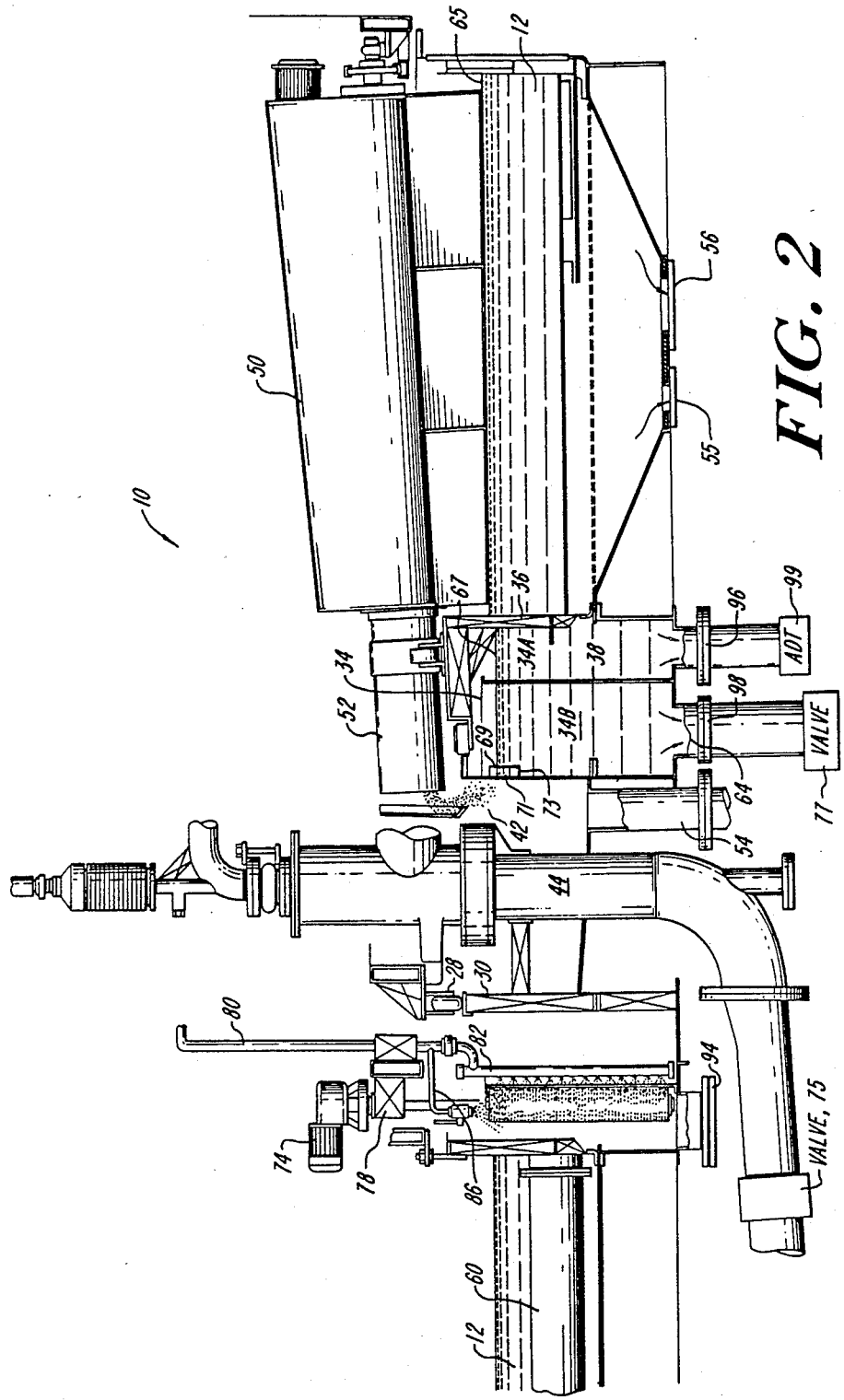
FIG. 2 is a fragmentary side view of the system shown in FIG. 1.

The water clarification system 10 shown in FIGS. 1 and 2 is basically the system of the beforementioned Krofta U.S. Pat. No. 4,022,696 with certain modifications to be discussed herein to incorporate the teachings and apparatus of this invention. To the extent the system of this invention is the same as that described in the beforementioned patent, the description of the system herein shall be in only sufficient detail to enable an understanding of the current invention. Reference may be had to the patent for a more complete description of the water clarification system.

The system consists of a cylindrical flotation tank 12 having a carriage 14 mounted for rotation over the tank. As may be best seen in FIG. 1, carriage 14 is in the form of a frame having a pair of side bars 16A and 16B which are joined at their far end by an arc-shaped bar 18 and are joined at a point beyond the center of the system by a cross bar 20, behind which is a C-shaped end bar 22. Frame 14 is supported by rollers 24 which ride on the top of outer wall 26 of tank 12 and a roller 28 which rides on the upper surface of an inner wall 30 of the system. Roller 28 completes a revolution around the upper surface of wall 30 as rollers 24 complete a revolution about the upper surface of wall 24.

Internal of cylindrical tank 12 is a clarified water storage area 34, the outside perimeter of which is defined by a wall 36 attached to carriage 14 and the inside surface of which is defined by the wall 30. Area 34 is divided into subareas 34A and 34B by a screen 38 positioned in area 34. As may be best seen in FIG. 1, screen 38 is circular in shape and, for ease of installation and removal, is formed in three sections which are joined at joints 40. While the screen has been shown as divided into three sections in FIG. 1, it is apparent that the screen can be divided into any number of desired sections, or could be a single piece, depending on application.

Internal of clarified water storage area 34 is a cylindrical sludge storage area 42 which is defined in one dimension by wall 30 and in the internal dimension by inlet pipe 44. Water to be clarified is applied to the system through inlet pipe 44 and distribution pipe 46 which pipe rotates with carriage 14. A plurality of pipes (not shown) extend down from pipe 46 into tank 12 and direct jets of water at various heights into tank 12. The water applied to the system through pipe 44 has air and a flocculating chemical such as alum dissolved therein. This results in particulate matter in the inlet water forming and accumulating around air bubbles in the water and rising to the surface of tank 12, such flotation occurring in a well known manner. A scoop 50 mounted for rotation with carriage 14 collects sludge from the surface of tank 12 and passes the collected sludge through pipe 52 and area 42 to sludge outlet pipe 54. Any sludge accumulating at the bottom of tank 12 is removed through ducts 55 and 56.

A plurality of pipes 60 extends from the wall 36 into the tank 12 at a position a few inches from the bottom of the tank. In FIG. 1, three pipes 60 are shown. With particulate matter floated to the top of tank 12, the water at the bottom of the tank in the area of pipes 60 is clarified. This clarified water passes under the action of gravity through a plurality of openings (not shown) formed in each pipe and through pipes 60 into clarified water storage area 34. The wall 36 and the pipe 60 are mounted to the cariage 14 and rotate in unison with it. As noted in applicant's U.S. Pat. No. 4,022,696, a rubber seal mounted at the lower edge of the wall 36 provides a movable barrier between the tank 12 and the clarified water storage area 34.

While the water entering area 34, and in particular area 34A thereof, has had most of the particulate matter removed therefrom and is adequately clarified for most applications, particles still exist in such water of a size in excess of 100 to 300 microns. As previously indicated, particles of such size are large enough to clog shower heads and other small orifices.

Therefore, in accordance with the teachings of this invention, the screen 38 is positioned in area 34 between the inlets thereto from pipes 60 and clarified water outlet 64. The size of the openings in screen 38 will vary with application, but would typically be in the 100 to 200 micron range. Water passing through screen 38 to area 34B and out through outlet 64 thus has all particles of a size in excess of the screen size removed. Since it is important that all water passing from area 34A to area 34B pass through screen 38 rather than over the top of the screen, the height of screen 38 must be higher than the maximum anticipated water level in area 34. As may be best seen in FIG. 2, the water level 65 in tank 12 is higher than the water level 67 in storage area 34A which is in turn higher than the water level 69 in storage area 34B. Thus, by maintaining the screen 38 at least as high as the highest water level in the system, level 65, the objective of assuring 100% filtration is maintained. However, this requires that all water levels remain as shown in FIG. 2. In the system of the beforementioned Krofta patent, desired water levels can be maintained through use of an overflow control valve. However, in the system of FIG. 2, such an overflow control is not usable. Therefore, a level control monitor 71 having an output line 73 is shown in storage area 34B. The output signal on line 73 may be utilized to control a valve 75 in unclarified water input line 44 or to control a valve 77 in the output pipe 98 from storage area 34B. In either event, the desired water levels may be maintained, assuring that 100% of the clarified water being outputted from the system is filtered.

A major problem with having a screen such as screen 38 in a water clarification system is that the screen quickly becomes clogged by the filtered particulate matter and would thus eventually block flow of clarified water if a means were not provided for continuously cleaning the screen. Depending on configuration, such blockage would normally occur within 5 minutes to a half hour of use without cleaning. Heretofore, an effective method of continuously cleaning the screen in a water clarification system has not existed and it has therefore not been possible to provide a screen in such systems. However, in accordance with the teachings of a first embodiment of this invention, means are provided which (a) clean the outer or inlet side of the screen, (b) apply water pressure to the inner or outlet side of the screen to loosen and remove particles trapped by the screen, forcing such particles into chamber 34A, and (c) flush the particles filtered by and removed from the screen.

Figure 3:
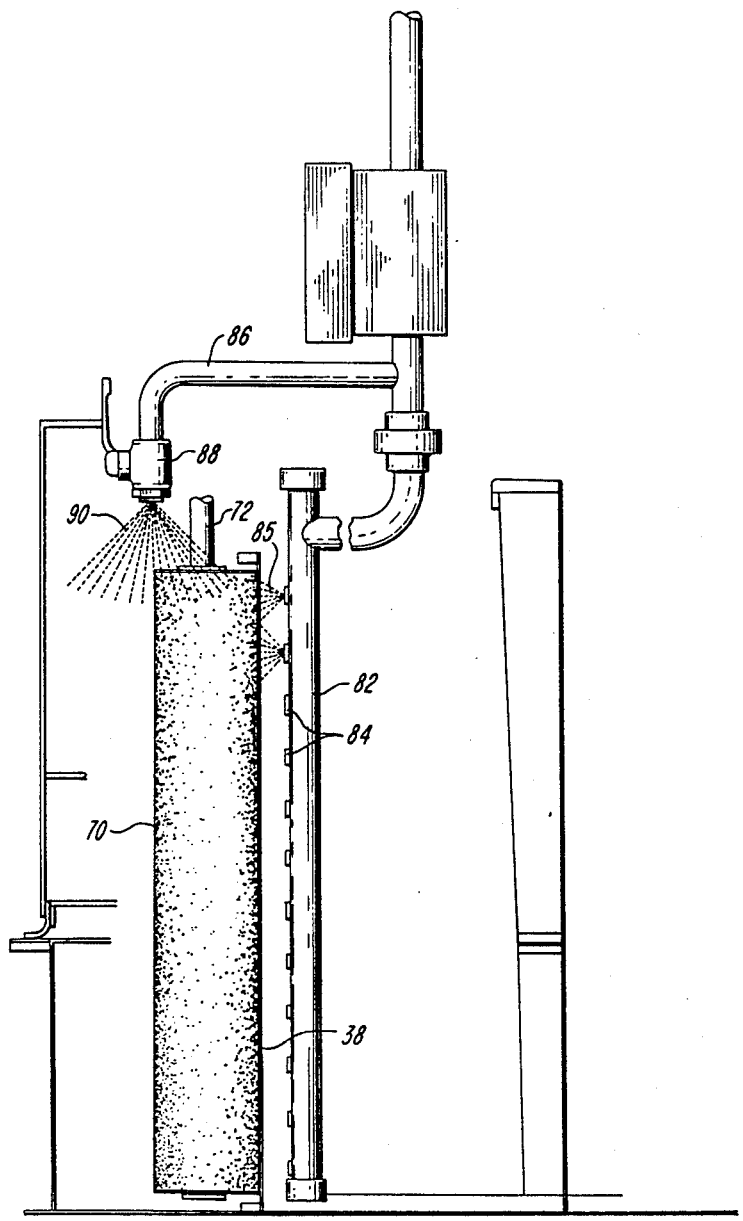
FIG. 3 is an enlarged side view of apparatus utilized in the system of FIGS. 1 and 2 in accordance with the teachings of this invention.

More particularly, referring to FIG. 3 in conjunction with FIGS. 1 and 2, it is seen that a pair of soft brushes 70 are provided which are vertically mounted adjacent to and in contact with the inlet side of screen 38 at positions spaced approximately 180° from each other. Each brush 70 is attached to a shaft 72 running through its center which shaft is attached through suitable gearing, if necessary, to be rotated at relatively low speed by a motor 74. Brushes 70 would typically rotate at a rate of 10–100 rpm. Each shaft 72 passes through a bracket 78 which is attached to frame 14. Brushes 70 thus rotate with the frame. The spacing between the brushes and roller 28 are such that, as the frame rotates, the brushes are caused to move across the entire outer or inlet surface of screen 38.

Also passing through each bracket 78 is an inlet pipe 80 containing clarified water and preferably clarified water from which large particulate matter has been removed (i.e. filtered water from outlet 98). The water in pipe 80 is applied through head 82 to a plurality of nozzles 84, each of which directs a shower 85 of high pressure water against the inner or outlet side of screen 38. The vertical spacing between the nozzles 84 and the dispersion of the water shower therefrom is such that head 82 causes water to be showered along a continuous line of screen 38 from the top thereof to the bottom.

The water from each pipe 80 is also diverted through pipe 86 to shower head 88 which directs a shower of high pressure clarified water 90 against the corresponding brush 70 to wash and flush particles removed from the screen by the brush.

The water from showers or jets 85 loosens and removes particles trapped by screen 38, permitting the particles to be easily removed from the screen by brush 70, and prevents particles from being pushed through the screen by the brush into area 34B. The water from water jets 85 which passes through screen 38 in conjunction with the water in shower 90, flushes removed particles from the screen and brush and carries the removed particles to outlets 94 and 96. The clarified water which passes through screen 38 and thus has the particulate matter of less than 100 to 300 microns removed, exits from the system through outlet pipe 98.

In order to prevent a buildup of removed particles in area 34A, and thus to maintain uniform flow rate, roughly 20% of the clarified water in area 34A is removed through the bottom of this area and through pipes 94 and 96. The water in these pipes is passed through an air dissolving tube (ADT) 99 and a pump (not shown) which recycles such water to inlet pipe 44. A portion of the clarified water outputted through pipe 98, for example 25% of such water, may be fed back into the system through pipes 80 to be used for cleaning the screen and flushing particulate matter. Since each pipe 80 is attached to a corresponding bracket 78 which is in turn attached to frame 14, each head 82 and nozzle 88 rotate about screen 38 in conjunction with the corresponding brush 70.

FIGS. 4, 4A shows a second preferred embodiment of the invention differs in several respects from the embodiment shown in FIGS. 1–3. First, this embodiment of the invention is far less expensive to produce and operate. Second, with this embodiment of the invention, only a percentage of the clarified water is filtered, for example, 50 to 60 percent of the clarified water, rather than 100% of the water being filtered as in the embodiment of FIGS. 1–3. This embodiment of the invention would thus be suitable for applications where some of the water is being used for example for domestic applications where the water may be required to pass through small orifices while the remainder of the water is being used for industrial or other purposes where the presence of a small quantity of particulate matter of a size in excess of 100 to 300 microns is acceptable. Third, cleaning of the screen, in this case two screen, is accomplished by use of water pressure applied to the outlet side of the screens only, and brushes or other cleaning apparatus on the inlet side of the screen are not employed. Fourth, desired water levels are maintained by the simpler overflow control rather than requiring the more expensive monitor and valves.

Considering the second embodiment in greater detail, the clarified water storage area 34 is subdivided into three areas 34X, 34Y and 34Z. Areas 34X and 34Z are separated by a wall 100 which is formed in two telescoping sections 102 and 104. Section 102 is fixed to the bottom of storage area 34 while section 104 may be raised or lowered for reasons to be discussed in more detail later with respect to section 102, to alter the height of wall 100.

Area 34X is separated from area 34Y by a pair of spaced concentric circular screens which are mounted in area 34Y and are supported by a frame structure 108 having a solid bottom 110. Each screen 38A and 38B is of the same type as screen 38 of the first embodiment and performs the same filtering function. Clarified filtered water passing through area 34Y is removed from the system through an outlet pipe 112. Unfiltered clarified water which flows into area 34X is removed from the system through outlet pipe 114.

A spray head 113 which is connected to be fed by pipe 80 passing through bracket 78 is positioned in area 34Z substantially midway between screens 38A and 38B. As for the first embodiment, a portion of the filtered clarified water from outlet 112 is pumped or otherwise fed to pipe 80. The spray head 113 has a first row of nozzles 114 which direct a high-pressure shower of filtered clarified water at screen 38A and a second row of nozzles 116 on the side of the head opposite nozzles 114 which direct a high-pressure shower 118 of filtered clarified water at screen 38B. The high-pressure water directed at the outlet side of both screens is effective to loosen and remove particulate matter trapped by the screens and to maintain the screens sufficiently clean to permit continued flow of clarified water therethrough. As with the previous embodiment of the invention, since pipe 80 is mounted to the bracket 78 which is in turn mounted to the rotating frame, head 113 rotates at a relatively low speed around area 34Z to clean the entire area of screens 38. Depending on the size of the system, the speed of frame rotation, and other factors, a single head 113 may be employed or two or more such heads may be utilized.

In operation, clarified water collected by pipes 60 in tank 12 is passed through one or more openings 120 in the bottom of wall 36 into area 34X. As before, wall 36 is rotating with carriage 14 and a seal 122 is provided between the bottom of this wall and the bottom of the tank to prevent seepage of water. The water flowing into area 34X fills this area with clarified water and also follows a flow path under bottom wall 110 of area 34Y and over wall 104 into area 34Z. The water flowing through this path carries with it particulate matter accumulating on the bottom of area 34X and causes some percentage of these particles to flow into area 34Z and out through outlet 114. Area 34Y being mounted above the bottom of are 34X provides a flow path for the water and particles under area 34Y to area 34Z.

Thus, unlike the first embodiment of the invention previously described, for the embodiment of the invention shown in FIG. 4, only a portion of the clarified water flowing into the clarified water storage area 34 is filtered and passed to filtered water outlet 112. The remaining clarified water which is unfiltered and which in fact has some extra particles which have been removed from the filtered water flows over wall 100 and through area 34Z to outlet pipe 114. The percentage of clarified water which is filtered is determined by the height of wall 100. If this wall is raised to substantially the level of the water in tank 12, substantially 100% of the water is filtered, and water flowing out through area 34Z and pipe 114 is basically overflow to control fluid level, eliminating the need for sensor 71 and valves 75 and/or 77. If the wall is lowered, a percentage of the clarified water applied through inlet 120 flows over the wall into area 34Z. In typical applications, 40% to 50% of the clarified water inputted through opening or openings 120 would overflow and pass through outlet 114 as unfiltered clarified water.

Apparatus is thus provided for use in an existing water clarification system which permits particulate matter above a predetermined size to be removed from the clarified water in the system. More particularly, a filtering screen is provided in the system between the clarified water inlet and outlets and means are provided which rotate with an existing frame (although the frame might have to be slightly modified) to permit continuous cleaning of the screen and to continuously flush particulate matter collected by the screen. Desired water levels are maintained throughout the system.

While for the preferred embodiments described above, a screen has been shown as the filtering element, a porous material or other filtering element capable of removing particulate matter above a predetermined size might be utilized. Similarly, while the screen has been stationary and the brushes and heads used for cleaning the screen and flushing have been rotated for the preferred embodiment, it is within the contemplation of the invention for there to be continuous relative motion between the filtering element and the cleaning elements, and this may be achieved by rotating either one or both of the elements. The exact configuration will vary with application. The nature and location of the screen or screens will also vary with the application, as will the specific configuration used for cleaning and flushing. Thus, while two brushes 70 and heads 82 or heads 113 have been shown for preferred embodiments, depending on the speed of rotation of the elements and the size of the system, only one set of cleaning elements may be required in some applications and three or more sets of cleaning elements may be required in other applications. Further, while brushes have been shown for the first preferred embodiment of the invention, a squeegee or other suitable element may be utilized for this purpose. A vacuum or other cleaning element may also be utilized in appropriate applications.

Thus, while the invention has been described above with respect to preferred embodiments thereof, the foregoing and other changes of form and detail may be made therein by one skilled in the art without departing from the spirit and scope of the invention.

What is claimed is:

1. A water clarification system comprising:
   a cylindrical flotation tank;
   a carriage rotating above said tank;
   first means rotating with said carriage for inputting water to be clarified into said tank, said water having dissolved air and a flocculating chemical therein which combine to cause particles in the water to float to the surface of the tank;
   second means for rotating at least in part with said carriage for collecting particles on the surface of the tank and for outputting the collected particles;
   third means for removing clarified water from a point near the bottom of said tank;
   a clarified water outlet;
   a circular screen having openings of less than a predetermined size positioned between said third means and said clarified water outlet to remove particles of greater than said predetermined size from the clarified water; and
   means rotating with said carriage for cleaning the screen including a row of shower nozzles positioned to direct clarified water from substantially the top to substantially the bottom of the outlet side of the screen, and means for mounting the row of nozzles for rotation with the carriage over the outlet side of the screen.

2. A system as claimed in claim 1 wherein said means for cleaning includes means rotating at least in part with said carriage for flushing particles removed from the water by said screen.

3. The system according to claim 1 wherein the portion of the clarified water which is removed with the particles therein is recycled in the system.

4. A water clarification system comprising:
a cylindrical flotation tank;
a carriage rotating above said tank;
first means rotating with said carriage for inputting water to be clarified into said tank, said water having dissolved air and a flocculating chemical therein which combine to cause particles in the water to float to the surface of the tank;
second means rotating at least in part with said carriage for collecting particles on the surface of the tank and for outputting the collected particles;
third means for removing clarified water from a point near the bottom of said tank;
a clarified and filtered water outlet;
a clarified and unfiltered water outlet;
circular screen means having openings of less than a predetermined size positioned between said third means and said clarified filtered water outlet to remove particles of greater than said predetermined size from the clarified water; and means rotating with said carriage for cleaning said means screen including means for showing water under pressure on said screen means, a portion of said removed particles flowing to said clarified and unfiltered water outlet.

5. The system according to claim 4 wherein said means for showering water under pressure includes at least one row of shower nozzles adapted to apply water under pressure along a line from substantially one edge of said screen means to the other in one dimension, and means for moving the row of nozzles relative to the screen means in the other dimension, whereby water under pressure may be applied across the entire outlet side of the screen means.

6. Apparatus as claimed in claim 4 wherein said screen means comprises a pair of spaced, concentric circular screens wherein said cleaning means includes means positioned in the space between said screens for applying water under pressure to the outlet sides of both of said screens.

7. The system according to claim 4 including means for controlling the relative percentage of said clarified water which passed through said clarified and filtered water outlet and said clarified and unfiltered water outlet.

8. The system of claim 7 wherein said means for controlling relative percentages also controls the relative water levels in said system.

* * * * *